United States Patent [19]

Minjolle et al.

[11] Patent Number: 4,585,500

[45] Date of Patent: Apr. 29, 1986

[54] METHOD OF MANUFACTURING A REINFORCED COMPOSITE STRUCTURE OF CERAMIC MATERIAL

[75] Inventors: Louis Minjolle, Tarbes; Claudette Drouet, Juillan; Bernard Lengronne, Monségur; Alain Hordonneau, Saint Aubin de Medoc; Bernard Capdepuy, Saint Medard en Jalles, all of France

[73] Assignee: Ceraver, Paris, France

[21] Appl. No.: 675,593

[22] Filed: Nov. 28, 1984

[30] Foreign Application Priority Data

Dec. 1, 1983 [FR] France .................... 83 19208

[51] Int. Cl.$^4$ .................. C04B 35/58; C04B 35/65; C04B 35/76

[52] U.S. Cl. ........................... 156/89; 264/60; 264/63; 264/66; 423/412; 501/92; 501/95; 501/96; 501/98

[58] Field of Search ............ 264/60, 61, 63; 501/95, 501/96, 92; 423/412; 156/89

[56] References Cited

U.S. PATENT DOCUMENTS

| | | | |
|---|---|---|---|
| 2,839,413 | 6/1958 | Taylor | 501/92 |
| 2,929,126 | 3/1960 | Bollack et al. | 423/412 |
| 3,238,018 | 3/1966 | Winter et al. | 423/412 |
| 3,899,554 | 8/1975 | Kaiser et al. | 264/61 |
| 4,233,077 | 11/1980 | Hazel | 501/96 |
| 4,265,794 | 8/1979 | Pett et al. | 264/63 |

FOREIGN PATENT DOCUMENTS

| | | | |
|---|---|---|---|
| 32097 | 7/1981 | European Pat. Off. | |
| 128409 | 12/1984 | European Pat. Off. | 264/59 |
| 1001867 | 8/1965 | United Kingdom . | |
| 1335842 | 10/1973 | United Kingdom . | |

Primary Examiner—Helen M. McCarthy
Attorney, Agent, or Firm—Sughrue, Mion, Zinn, Macpeak, and Seas

[57] ABSTRACT

An improved method of manufacturing a composite structure of ceramic material reinforced by refractory fibers is disclosed, whereby the fibers are first embedded in a slip of the ceramic material containing a synthetic resin with good ceramic and fiber wetting properties and a solvent of said resin, the liquid phase is thereafter eliminated from the slip by drying, the synthetic resin is driven from the formed structure by heating, and the fiber-reinforced ceramic material is sintered. The improvement consists in avoiding the use of costly aluminum-nitride powder by initially incorporating an aluminum powder in the slip along with the resin solvent and nitriding the powder in the structure, after drying and firing, but before sintering.

4 Claims, No Drawings

METHOD OF MANUFACTURING A REINFORCED COMPOSITE STRUCTURE OF CERAMIC MATERIAL

T-is invention concerns a method of manufacturing a composite structure of a ceramic material reinforced by refractory fibers, whereby the fibers are first embedded in a slip of the ceramic material containing a synthetic resin with good ceramic and fiber wetting properties and a solvent of said resin, the liquid phase being thereafter eliminated from the slip by drying, whereafter the synthetic resin is driven from the formed structure by heating, and the fiber-reinforced ceramic material is sintered.

A variety of ceramic materials can be used to form the matrix of the composite structure, including silicon nitride, silicon carbide, alumina, alumina-magnesia spinel, zirconia, magnesia and mullite, the matrix materials being incorporated from the outset in the slip in which the fibers will be embedded.

Document FR-A-2084703 describes a method of this type whereby powdered silicon is mixed with a polymer-in-liquid dispersion, the disperser is heated out, a body is formed from the silicon-polymer mixture, the polymer is burned out and thereafter the body is nitridingly sintered in a nitrogen atmosphere.

Assignee's European patent application No. 841058035, dated May 22, 1984, relates to a method of manufacturing a composite structure of a ceramic material reinforced by refractory fibers whereby a slip is first prepared, comprising a synthetic resin with good ceramic and fiber wetting properties, after which the fibers are embedded in the slip, the liquid phase of the slip is eliminated by drying, the synthetic resin is driven from the formed structure by firing and the fiber-reinforced ceramic is sintered, said method being further characterized in that a solvent of the synthetic resin is incorporated in the slip and that the fibers are inserted in the slip, prior to drying, in the form of a sheet or a roving.

Trials made by Assignee have shown that it is also possible to use aluminum nitride as a matrix material, to provide composite structures with outstanding mechanical properties. However, aluminum nitride in powdered form is very costly and is difficult to obtain in a sufficiently pure state.

The method of the present invention is directed to providing an aluminum-nitride-matrix composite structure not requiring the input of said material.

The main improvement of the method resides in that an aluminum powder is initially incorporated into the slip, along with the synthetic resin and solvent, and in that, after suitably drying and firing, the structure is subjected to a nitriding of its aluminum powder, prior to sintering.

The burner or firing operation is preferably carried out in a vacuum, with a rise in temperature from ambient to 400° C. in a minimum of 40 hours, keeping weight losses to a maximum of 0.5% per hour.

Nitriding of the aluminum powder is preferably carried out in the 700° to 800° C. range—a relatively moderate heat that will not damage most refractory fibers, including silicon carbide fibers.

The best nitriding results are obtained by raising the temperature of the composite structure from ambient temperature to 400° C. at a rate of 100° C. per hour, then from 400° C. to 700° C. at 5° C. per hour, and maintaining the latter temperature for at least 3 hours, with nitrogen circulating around the structure for the entire procedure.

A procedure for making thin sheets or coated fibers in a matrix of aluminum nitride will now be described by way of example.

In a jar, dissolve a resin such as polystyrene or polyvinyl butyral in trichloroethylene.

Place the following into the solution:
micronized aluminum powder with an average particle size of about 5 microns,
a paraffin wax,
a plastifier such as dibutyl phthalate
and a surfactant such as ammonium sulforicinate.

Mill the mixture for 5 hours.
Empty and strain the slip.
Vacuum and stir-degas the slip.

Pour the slip onto the starting end of a conveyor belt, while unreeling silicon carbide or alumina fibers from a suitable reel into the slip, as described in examples 1 to 3 of co-pending application Ser. No. 614,076, filed May 25, 1984.

To fabricate structures using thin sheets, the slip-coated fibers are poured onto a glass plate covered in advance with an antiadhesive film. Drying is done in free air and completed, as required, with infrared radiation. The formed sheets are separated from the belt and cut into strips. The strips are then stacked and heated to 135°–150° C., causing them to stick together.

For composite structures more easily fabricated from braided material, rovings are instead inserted into the slip and, on leaving the belt, are passed through a calibrating nozzle, whereafter they are dried, wound up and heat-glued to one another at a temperature of 135°–150° C. and optionally by pressing.

In both cases, the structures obtained—whether from sheets or braids—are fired in a vacuum to eliminate the paraffin wax and the resin, raising the temperature from 20° C. to 400° C. over 40 hours under thermogravimetric monitoring to ensure a constant rate of weight loss not exceeding 0.5% per hour.

The next step is nitriding. The parts to be nitrided are arranged in an airtight kiln which is put under a vacuum at ambient temperature. The vacuum is maintained for one hour, after which the kiln is flushed with nitrogen, flowing at 0.4 l/min, for 30 minutes. Whilst continuing the nitrogen gassing, the temperature is raised from ambient temperature to 400° C. at a rate of 100° C./hour. The nitrogen flow rate is corrected to compensate for fixation of nitrogen by the parts. The temperature is then raised to 700° C., at a rate of 5° C./hour over 60 hours. This temperature is maintained for at least 3 hours, then the kiln is allowed to cool to 100° C. while still supplying nitrogen thereto.

Finally, the composite structure is sintered without particular gas pressure by heating it to 1800° C., maximum, for one hour.

Several other ceramic fibers can be used in the improved method according to the invention besides alumina and silicon carbide fibers, including short mullite fibers, pure silica fibers, silicon nitride and boron nitride fibers and whiskers.

We claim:

1. A method for manufacturing an aluminum nitride matrix composite structure not requiring the input of said nitride, said structure being of a ceramic material reinforced with refractory fibers, comprising preparing a slurry containing aluminum powder, a synthetic resin and an organic for said resin; introducing refractory fibers selected from the group consisting of alumina, silicon carbide, short mullite, pure silica, silicon nitride and boron nitride fibers and whiskers into said slurry; removing the liquid phase from said slurry by drying to form a structure; firing the formed structure to remove the synthetic resin; then subjecting the structure to nitriding of the aluminum powder to form aluminum nitride and sintering the nitrided structure without particular gas pressure and under temperature conditions such that the refractory fibers are not damaged.

2. Method according to claim 1, wherein firing is carried out in a vacuum with temperature being raised from ambient to 400° C. in at least 40 hours, whilst keeping weight losses to a maximum of 0.5% per hour.

3. Method according to claim 2 or 1, wherein said nitriding is carried out at a temperature of approximately 700° to 800° C.

4. Method according to claim 3, wherein said nitriding is carried out by injecting nitrogen gas and raising the temperature from ambient temperature to 400° C. at a rate of 100° C./hour, then from 400° C. to 700° C. at a rate of 5° C./hour, then keeping the temperature at 700° C. for at least three hours.

* * * * *